(12) United States Patent
Blayne et al.

(10) Patent No.: US 9,068,076 B2
(45) Date of Patent: Jun. 30, 2015

(54) FIBER REINFORCED TPU COMPOSITES

(75) Inventors: Jerome J. Blayne, Brecksville, OH (US); Kemal Onder, Brecksville, OH (US); Shane R. Parnell, Carlsbad, CA (US); Kimberly L. Young, Cleveland Heights, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 948 days.

(21) Appl. No.: 12/991,992

(22) PCT Filed: May 20, 2009

(86) PCT No.: PCT/US2009/044589
§ 371 (c)(1),
(2), (4) Date: Feb. 28, 2011

(87) PCT Pub. No.: WO2009/143198
PCT Pub. Date: Nov. 26, 2009

(65) Prior Publication Data
US 2011/0143031 A1  Jun. 16, 2011

Related U.S. Application Data

(60) Provisional application No. 61/055,701, filed on May 23, 2008.

(51) Int. Cl.
| | |
|---|---|
| C08L 75/04 | (2006.01) |
| C08L 75/06 | (2006.01) |
| C08G 18/24 | (2006.01) |
| C08G 18/32 | (2006.01) |

(52) U.S. Cl.
CPC ............... *C08L 75/06* (2013.01); *C08G 18/246* (2013.01); *C08G 18/3206* (2013.01)

(58) Field of Classification Search
CPC ....... C08L 75/04; C08L 75/06; C08G 2261/73
USPC ....................................... 427/430.1; 525/458
See application file for complete search history.

(56) References Cited

U.S. PATENT DOCUMENTS

| | | | | |
|---|---|---|---|---|
| 4,129,611 | A | | 12/1978 | Heiss |
| 4,202,957 | A | * | 5/1980 | Bonk et al. ...................... 528/77 |
| 5,089,571 | A | | 2/1992 | Bonk et al. |
| 5,250,607 | A | * | 10/1993 | Comert et al. ................ 524/507 |
| 5,262,447 | A | * | 11/1993 | Tucker ........................... 521/125 |
| 6,346,325 | B1 | * | 2/2002 | Edwards et al. .............. 428/401 |
| 2003/0211957 | A1 | * | 11/2003 | Lohr et al. .................... 510/201 |
| 2005/0189677 | A1 | | 9/2005 | Lucka |

FOREIGN PATENT DOCUMENTS

| | | |
|---|---|---|
| EP | 0063280 A2 | 10/1982 |
| EP | 0659792 A2 | 6/1995 |
| EP | 1016423 A1 | 7/2000 |
| WO | 91/00304 A1 | 1/1991 |
| WO | 01/02470 * | 1/2001 |
| WO | 01/02470 A1 | 1/2001 |
| WO | 02/12396 A1 | 2/2002 |
| WO | 02/16695 A1 | 2/2002 |
| WO | 2005/123836 A1 | 12/2005 |

OTHER PUBLICATIONS

ISOPLAST Engineering TPU-Medical Resins. LUBRIZOL Advanced Materials BVBA. Sep. 2010. Evidentiary Reference.*

* cited by examiner

*Primary Examiner* — Mike M Dollinger
(74) *Attorney, Agent, or Firm* — Eryn Ace Fuhrer, Esq.; Teresan W. Gilbert, Esq.

(57) ABSTRACT

A catalyst masterbatch is disclosed, which when used with a rigid TPU polymer, will cause the rigid TPU to depolymerize during melt processing and repolymerize as the melt is being cooled. This feature is of particular interest in a pultrusion process to create TPU/fiber composites. The catalyst masterbatch contains a relative soft TPU polymer where the catalyst has been swelled or absorbed into the soft TPU polymer. A carrier, such as a plasticizer, can be used to aid the transport of the catalyst into the soft TPU polymer. The catalyst masterbatch is used as an additive to the rigid TPU in a pultrusion process to make the composites. The catalyst masterbatch can also be used in non-fiber reinforced rigid TPU compositions to increase the Mw of melt processed rigid TPU.

20 Claims, No Drawings

FIBER REINFORCED TPU COMPOSITES

CROSS REFERENCE TO RELATED APPLICATION

This application claims priority from PCT Application Serial No. PCT/US2009/044589 filed on May 20, 2009, which claims the benefit of U.S. Provisional Application No. 61/055,701 filed on May 23, 2008.

FIELD OF THE INVENTION

The present invention relates to fiber reinforced thermoplastic polyurethane (TPU) composites. The composites are made by a pultrusion process where fiber bundles are drawn through a melt of TPU. The TPU melt contains a rigid TPU and a catalyst masterbatch. The catalyst masterbatch is made from a TPU polymer containing a catalyst capable of depolymerizing TPU at melt processing temperatures and repolymerizing the TPU as the melt is being cooled.

BACKGROUND OF THE INVENTION

Thermoplastic polyurethane (TPU) polymers are normally made by reacting a polyisocyanate with a hydroxy terminated intermediate (known as a polyol) and a short chain diol chain extender. The hydroxy terminated intermediate (polyol) forms the soft segment of the polymer, while the polyisocyanate and chain extender form the hard segment of the polymer. The hardness of the TPU polymer can be controlled by the amount of hard and soft segments in a particular TPU.

U.S. Pat. No. 4,376,834 discloses a rigid TPU which is made using small amounts, and preferably no polyols. The rigid TPU is made by reacting a polyisocyanate with a short chain diol chain extender. Rigid TPUs of this type are often referred to as engineering resins and can be used in structural applications, such as automotive parts, and the like.

The rigid TPUs of U.S. Pat. No. 4,376,834 have also found use in fiber composites. The normal method to produce such composites is by a process known as pultrusion. In the pultrusion process, fibers are pulled through a polymer melt to coat the fibers with the polymer. It is desirable to have the polymer melt have the lowest viscosity possible to enhance the "wetting" of the fibers by the polymer. Good wetting by the polymer enhances the properties of the composite.

The viscosity of the polymer melt can be reduced by increasing the temperature of the polymer melt. TPU polymers tend to depolymerize when heated to temperatures necessary to lower their viscosity enough to achieve good wetting of the fibers in a pultrusion process. When a TPU has been subject to depolymerization, it will have reduced physical properties, such as modulus, impact strength and molecular weight.

It has been suggested that this problem can be solved by adding a TPU catalyst to the TPU reactants when the TPU is first made. The catalyst would speed the depolymerization in the melt, thus reducing the melt viscosity, but be available to repolymerize the TPU as the melt is cooled.

In processes, such as the one-shot polymerization process to make highly rigid TPU, adding catalyst to the polymerization process can create other problems. Highly rigid TPU made by reacting a polyisocyanate with a short chain diol, the reaction is very exothermic and is difficult to remove the excess heat in the one-shot process. The adding of catalyst to this process increases the reaction rate and makes the problem more pronounced.

It would be beneficial to have a method of adding a TPU catalyst to an already prepared highly rigid TPU, so the catalyst would be available in subsequent processing to depolymerize and repolymerize the TPU in a quick manner.

SUMMARY OF THE INVENTION

A TPU composition is provided which comprises a first rigid TPU polymer and a catalyst masterbatch. The catalyst masterbatch is made from a second TPU polymer which contains a catalyst capable of depolymerizing at melt temperature and repolymerizing the first rigid TPU as the melt cools.

The catalyst masterbatch is made by starting with a second fully formed TPU polymer and swelling the catalyst into the TPU polymer. The swelling can be enhanced by using an inert carrier in combination with the catalyst, such as a plasticizer. The catalyst masterbatch is preferably in pellet form.

The preferred method to make the TPU composition of this invention is to blend the catalyst masterbatch in pellet form with the rigid TPU polymer in pellet form. The blended mixture is then fed to a melt processing equipment, such as an extruder, or injection molding machine where the catalyst masterbatch is troughly melt mixed with the rigid TPU.

The TPU composition can be used to form long fiber reinforced composites or a strand of the composite can be cut into lengths to give long fiber pellets which can be subsequently molded into various articles. The TPU composition containing the catalyst masterbatch can also be used to achieve enhanced properties of the TPU by increasing the molecular weight of the TPU.

DETAILED DESCRIPTION OF THE PREFERRED EMBODIMENT

First Rigid TPU Polymer

The first rigid TPU polymer is made by reacting a polyisocyanate with a short chain diol (i.e., chain extender), and optionally up to 15 weight percent of polyol. Preferably, the first rigid TPU polymer contains less than 5 weight percent polyol, and more preferably zero polyol is present in the first rigid TPU polymer. The first rigid TPU polymer has a durometer hardness of greater than 60 Shore D, preferably greater than 80 Shore D, and more preferably about 85 Shore D.

Suitable chain extenders to make the first rigid TPU polymer are lower aliphatic or short chain glycols having from about 2 to about 12 carbon atoms and include for instance ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol hydroquinone di(hydroxyethyl)ether, neopentyglycol, and the like, with 1,6-hexanediol being preferred.

Suitable polyisocyanate to make the first rigid TPU polymer include aromatic diisocyanates such as 4,4'-methylenebis-(phenyl isocyanate) (MDI); m-xylene diisocyanate (XDI), phenylene-1,4-diisocyanate, naphthalene-1,5-diisocyanate; diphenylmethane-3,3'dimethoxy-4,4'-diisocyanate and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. The most preferred diisocyanate is 4,4'-methylenebis(phenyl isocyanate), i.e., MDI.

Preferably, the first rigid TPU polymer is made by reacting the polyisocyanate above with the chain extender, without any polyol being present. If polyols are used, they should be used in small amounts of less than up to 15 weight percent, and more preferably less than 5 percent of the total TPU reactants. If used, the polyols, also known as hydroxyl terminated intermediates. The polyols which can be used are any of the normal polyols used in making TPU polymers. These include hydroxyl terminated polyesters, hydroxyl terminated polyethers, and hydroxyl terminated polycarbonates. Suitable hydroxyl terminated intermediates are described in more detail below in the description of the second TPU polymer which is used in the catalyst masterbatch.

The level of polyisocyanate, preferably diisocyanate, used is the equivalent weight of diisocyanate to the equivalent weight of hydroxyl containing components (i.e., hydroxyl terminated intermediate, if used, and the chain extender glycol). The ratio of equivalent weight of polyisocyanate to hydroxyl containing components is from about 0.95 to about 1.10, and preferably from about 0.96 to about 1.02, and more preferably from about 0.97 to about 1.005.

The reactants to make the first rigid TPU polymer are reacted together in preferably a one-shot polymerization process, as is well known to those skilled in the art. The one-shot process involves feeding the reactants to a heated twin screw extruder where the reactants are polymerized and the polymer is formed into pellets upon exiting the extruder.

Catalyst Masterbatch

The second necessary ingredient in the TPU composition of this invention is a catalyst masterbatch. The catalyst masterbatch comprises a second TPU polymer and a catalyst which is capable of depolymerizing the first rigid TPU at melt processing temperature and repolymerizing the first rigid TPU as the melt is being cooled.

The second TPU polymer used in the catalyst masterbatch can be any conventional TPU polymer that is known to the art and in the literature. The TPU polymer is generally prepared by reacting a polyisocyanate with an intermediate such as a hydroxyl terminated polyester, a hydroxyl terminated polyether, a hydroxyl terminated polycarbonate or mixtures thereof, with one or more chain extenders, all of which are well known to those skilled in the art.

The hydroxyl terminated polyester intermediate is generally a linear polyester having a number average molecular weight (Mn) of from about 500 to about 10,000, desirably from about 700 to about 5,000, and preferably from about 700 to about 4,000, an acid number generally less than 1.3 and preferably less than 0.8. The molecular weight is determined by assay of the terminal functional groups and is related to the number average molecular weight. The polyester intermediates are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from, epsilon-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like, 1,4-butanediol is the preferred glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene, oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly (propylene glycol) comprising propylene oxide reacted with propylene glycol, poly(tetramethyl glycol) comprising water reacted with tetrahydrofuran (PTMG). Polytetramethylene ether glycol (PTMEG) is the preferred polyether intermediate. Polyether polyols further include polyamide adducts of an alkylene oxide and can include, for example, ethylenediamine adduct comprising the reaction product of ethylenediamine and propylene oxide, diethylenediamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn), as determined by assay of the terminal functional groups which is an average molecular weight, of from about 250 to about 10,000, desirably from about 500 to about 5,000 and preferably from about 700 to about 3,000.

The polycarbonate-based polyurethane resin of this invention is prepared by reacting a diisocyanate with a blend of a hydroxyl terminated polycarbonate and a chain extender. The hydroxyl terminated polycarbonate can be prepared by reacting a glycol with a carbonate.

U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6,2,2,4-trimethylhexanediol-1,6, decanediol-1,10, hydrogenated dilinoleylglycol, hydrogenated dioleyiglycol; and cycloaliphatic diols such as cyclohexanediol-1,3, dimethylolcyclohexane-1,4, cyclohexanediol-1,4, dimethylolcyclohexane-1,3,1,4-endomethylene-2-hydroxy-5-hydroxymethyl cyclohexane, and polyalkylene glycols. The diols used in the reaction may be a single diol or a mixture of diols depending on the properties desired in the finished product.

Polycarbonate intermediates which are hydroxyl terminated are generally those known to the art and in the literature. Suitable carbonates are selected from alkylene carbonates composed of a 5 to 7 membered ring having the following general formula:

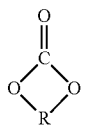

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° C., to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10,000 but in a preferred embodiment, it will be in the range of 500 to 2500.

Suitable extender glycols (i.e., chain extenders) are lower aliphatic or short chain glycols having from about 2 to about 10 carbon atoms and include for instance ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol hydroquinone di(hydroxyethyl) ether, neopentyglycol, and the like, with 1,4-butanediol being preferred.

The desired second TPU polymer used in the catalyst masterbatch of this invention is generally made from the above-noted intermediates such as a hydroxyl terminated polyesters, polyether, or polycarbonate, preferably polyester, which is further reacted with a polyisocyanate, preferably a diisocyanate, along with extender glycol desirably in a so-called one-shot process or simultaneous coreaction of polyester, polycarbonate or polyether intermediate, diisocyanate, and extender glycol to produce a high molecular weight linear TPU polymer. The preparation of the macroglycol is generally well known to the art and to the literature and any suitable method may be used. The weight average molecular weight (Mw) of the TPU polymer is generally about 50,000 to 500,000 Daltons, and preferably from about 80,000 to about 250,000, as measured according to gel permeation chromatography (GPC) against polystyrene standards. The equivalent weight amount of diisocyanate to the total equivalent weight amount of hydroxyl containing components, that is the hydroxyl terminated polyester, polyether, or polycarbonate, and chain extender glycol, is from about 0.95 to about 1.10, desirably from about 0.96 to about 1.02, and preferably from about 0.97 to about 1.005. Suitable diisocyanates include aromatic diisocyanates such as: 4,4'-methylenebis-(phenyl isocyanate) (MDI), m-xylylene diisocyanate (XDI), phenylene-1,4-diisocyanate, naphthalene-1,5-diisocyanate, diphenylmethane-3,3'-dimethoxy-4,4'-diisocyanate and toluene diisocyanate (TDI); as well as aliphatic diisocyanates such as isophoroue diisocyanate (IPDI), 1,4-cyclohexyl diisocyanate (CHDI), decane-1,10-diisocyanate, and dicyclohexylmethane-4,4'-diisocyanate. The most preferred diisocyanate is 4,4'-methylenebis(phenyl isocyanate), i.e., MDI.

The second TPU polymer used in the catalyst is a softer TPU than the first rigid TPU used in the TPU composition. The second TPU polymer has a hardness of less than 98 Shore A, preferably less than 90 Shore A, and more preferably less than 85 Shore A. Softer TPUs have an ability to absorb the catalyst more readily and are thus preferred.

At least one catalyst is used in the catalyst masterbatch. The catalyst used is one which is capable of depolymerizing the first rigid TPU at melt temperature and repolymerize the first rigid TPU as the TPU is being cooled from the melt. The catalyst should also be a hydrolytically and thermally stable catalyst. Suitable catalysts are tin catalysts which have two alkyl groups and two anion groups bonded to the tin. Suitable catalysts include dimethyl tin dilauryl mercaptide, dibutyl tin dilauryl mercaptide and dioctyl tin dilauryl mercaptide. The most preferred catalyst is dimethyl tin dilauryl mercaptide also known as bis-(dodecylthio)-dimethylstannane which is commercially available from Crompton Corporation as Fomrez® UL-22. Other catalysts may be used as long as they are capable of depolymerizing the first rigid TPU during melt processing so as to reduce the melt viscosity and then proceed to repolymerize the first rigid TPU as the melt is cooled.

To incorporate the catalyst into the second TPU, it is preferred to absorb the catalyst into the second TPU. This absorption can be accomplished by mixing the second TPU in pellet form with the liquid catalyst and agitating the mixture until the TPU pellets are dry to the touch. This is best accomplished using a ribbon blender but other methods could be used. To aid the absorption of the catalyst into the second TPU pellets, a carrier can be used to speed the absorption of the catalyst. Particular desirable carriers are materials which will readily absorb into TPU, such as plasticizers. Phthalate type plasticizers are the most preferred. Triisooctyl trimellitate has been found to be an excellent carrier.

The level of catalyst used in the catalyst masterbatch is from about 0.1 to about 10.0 weight percent of the second TPU polymer, preferably from about 1.0 to about 3.0 weight percent. If a carrier is used, such as a plasticizer, the level used is preferably from about 0.05 to about 5.0, and more preferably from about 0.5 to about 1.5 weight percent of the second TPU polymer.

The level of the catalyst masterbatch used in the TPU composition of this invention is from about 0.1 to about 15.0, preferably from about 0.5 to about 8.0, and more preferably from about 1.0 to about 3.0 weight percent based on the total weight of the first rigid TPU and the catalyst masterbatch.

The catalyst masterbatch in pellet form is blended with the first rigid TPU pellet form and added to an extruder. To make pultruded fiber composites, fiber bundles are drawn through the melt of the TPU composition. The fibers coated with the TPU composition are conveyed through a die to form the composite. When a strand of fiber composite is formed in the pultrusion process, the composite can be used in strand form for various applications or it can be cut into long fiber pellets for subsequent molding uses. For long fiber pellets, the strand is cut in lengths of from about 0.12 to about 1.0 inch, preferably from about 0.25 to about 0.75 inch.

The types of fiber used can be any organic or non-organic fibers. Examples of fibers are glass, carbon, aromatic polyamide, nylon, polyester, and the like. Glass fiber is the most preferred fiber used in the composite. The level of fiber in the composite is from about 10.0 to about 80.0, preferably from about 25.0 to about 55.0 weight percent of the composite.

The catalyst masterbatch can also be used in non-fiber reinforced TPU to increase the weight average molecular weight after melt processing over a similar TPU polymer without the catalyst masterbatch.

EXAMPLES

Example 1 is presented to show the use of the catalyst masterbatch together with a rigid TPU in the pultrusion process to make a glass reinforced TPU composite. Example 2 is presented to demonstrate the use of the catalyst masterbatch together with a rigid TPU in a melt processing application.

Example 1

A catalyst masterbatch was prepared by using a second TPU polymer having a Shore A durometer of 75. The second TPU polymer was made by reacting a 2500 Mn polyester polyol with MDI and an equal molar mixture of 1,4-butanediol and 1,6-hexanediol. The second TPU polymer had a Mw of between 300,000 and 400,000 Daltons.

The second TPU polymer in pellet form was mixed with catalyst (dimethyl tin dilauryl mercaptide) and triisooctyl trimellitate plasticizer as the carrier.

The catalyst was added to the carrier and this mixture was added to the second TPU polymer and absorbed or swelled into the TPU polymer using a ribbon blender until the liquid was absorbed, that is the TPU pellets were dry to the touch. The composition of the catalyst masterbatch was as follows:

| | |
|---|---|
| Second TPU polymer | 97 weight percent |
| Catalyst | 2 weight percent |
| Plasticizer | 1 weight percent |
| | 100 |

The above catalyst masterbatch in pellet form was blended with pellets of the first rigid TPU polymer to create a TPU composition in the following ratio:

| | |
|---|---|
| First rigid TPU polymer | 98 weight percent |
| Catalyst masterbatch | 2 weight percent |
| | 100 |

The first rigid TPU polymer used had a Shore D hardness of 85 and was made by reacting MDI with 1,6-hexanediol.

The blend of pellets (TPU composition) was added to an extruder and melted to form a polymer melt which was part of a pultrusion process. Glass fiber was coated with the polymer melt to form a TPU/glass fiber composite having 50 weight percent glass fiber.

The TPU composition had low melt viscosity and excellent wetting of the glass fiber was obtained, thus indicating that the first rigid TPU polymer experienced depolymerization during the melt process. As the composite exited the die of the pultrusion process, the melt cooled and repolymerization occurred.

The composite stand was cut into 0.5 inch lengths to form long glass fiber pellets. The long glass fiber pellets were subsequently used to mold test plaques using an injection molding machine.

Example 2

A catalyst masterbatch was prepared by using a second TPU polymer having a Shore A durometer of 75, as in Example 1.

The second TPU polymer in pellet form was mixed with catalyst and plasticizer (carrier) as in Example 1.

The catalyst was added to the carrier and this liquid mixture was added to the second TPU polymer in a Rotavap, and the mixture absorbed into the second TPU polymer over a period of 2 hours at 97° C. (via a water bath). After the liquid had completely absorbed into the second TPU polymer, the pellets were removed and stored in an aluminum foil bag and sealed to prevent contact with moisture. The composition of the catalyst masterbatch was as follows:

| | |
|---|---|
| Second TPU polymer | 99 weight percent |
| Catalyst | 0.5 weight percent |
| Plasticizer | 0.5 weight percent |
| | 100 |

The above catalyst masterbatch in pellet form was blended with pellets of the first rigid TPU polymer to create a TPU composition in the following ratio:

| | |
|---|---|
| First rigid TPU polymer | 99 weight percent |
| Catalyst masterbatch | 1 weight percent |
| | 100 |

The blend of pellets (TPU composition) was added to an extruder and processed through the extruder at a melt temperature of 250° C. A sample of the rigid TPU without any catalyst masterbatch (comparative sample) was also passed through the extruder at the same melt conditions. The weight average molecular weight (Mw) was measured (by GPC) on both samples passed through the extruder as well as on the pellets of the first rigid TPU before melt processing (comparative). The results are shown in Table I below.

TABLE I

| Sample | Mw |
|---|---|
| Pellets of first rigid TPU (comparative) | 77,715 |
| First rigid TPU w/o catalyst masterbatch (comparative) | 43,946 |
| First rigid TPU with catalyst masterbatch | 57,672 |

From the table above, it can be seen that the catalyst masterbatch allows the rigid TPU to regain a significant amount of its original pellet form Mw after processing.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

What is claimed is:

1. A process for making a thermoplastic polyurethane composition comprising the steps of:
   (a) providing a first rigid thermoplastic polyurethane polymer, said first rigid thermoplastic polyurethane polymer being made by reacting a polyisocyanate with a chain extender, without any polyol being present; and
   (b) providing a second thermoplastic polyurethane polymer;
   (c) absorbing at least one hydrolytically and thermally stable catalyst into said second thermoplastic polyurethane polymer after polymerization of said second thermoplastic polyurethane polymer, said catalyst being capable of depolymerizing said first rigid thermoplastic polyurethane at melt processing temperatures and repolymerizing said first rigid thermoplastic polyurethane as said first rigid thermoplastic polyurethane is cooled below melt processing temperatures, wherein said catalyst comprises dimethyl tin dilauryl mercaptide, dibutyl tin dilauryl mercaptide, or dioctyl tin dilauryl mercaptide;
   (d) blending said first rigid thermoplastic polyurethane polymer and said second thermoplastic polyurethane polymer to form a thermoplastic polyurethane polymer blend;
   (e) melting said thermoplastic polyurethane blend, wherein while the thermoplastic polyurethane blend is melting, said catalyst depolymerizes said first thermoplastic polyurethane polymer; and
   (f) cooling said thermoplastic polyurethane blend, wherein while the thermoplastic polyurethane blend is cooling, said catalyst repolymerizes said first thermoplastic polyurethane polymer.

2. The process of claim 1, wherein said first rigid thermoplastic polyurethane polymer is an engineering grade thermoplastic polyurethane having a hardness greater than 60 Shore D.

3. The process of claim 2, wherein said first rigid thermoplastic polyurethane polymer has a hardness greater than 80 Shore D.

4. The process of claim 3, wherein said first rigid thermoplastic polyurethane polymer is made from the reaction of at least one polyisocyanate and at least one glycol chain extender.

5. The process of claim 1, wherein said second thermoplastic polyurethane polymer has a hardness of less than about 98 Shore A.

6. The process of claim 5, wherein said second thermoplastic polyurethane polymer has a hardness of less than about 90 Shore A.

7. The process of claim 5, wherein said second thermoplastic polyurethane polymer comprises at least one plasticizer.

8. The process of claim 1, wherein said first rigid thermoplastic polyurethane polymer is present at a level of from about 85.0 to about 99.8 weight percent of the total weight of said thermoplastic polyurethane blend.

9. The process of claim 8, wherein said first rigid thermoplastic polyurethane polymer is present at a level of from about 95.0 to about 98.5 weight percent of the total weight of rigid thermoplastic polyurethane blend.

10. The process of claim 1, wherein said catalyst is present in said second thermoplastic polyurethane polymer at a level of from about 0.1 to about 10.0 weight percent of said second thermoplastic polyurethane polymer.

11. The process of claim 10, wherein said catalyst is present at a level of from about 1.0 to about 3.0 weight percent.

12. The process of claim 7, wherein said plasticizer is at least one phthalate plasticizer.

13. The process of claim 7, wherein said plasticizer is present at a level of from 0.25 to about 5.0 weight percent of said second thermoplastic polyurethane polymer.

14. The process of claim 13, wherein said plasticizer is present at a level of from about 0.5 to about 2.0 weight percent of said second thermoplastic polyurethane polymer.

15. A process for preparing a fiber-reinforced rigid thermoplastic polyurethane composite article comprising the steps of:
   (a) providing a first rigid thermoplastic polyurethane polymer, said first rigid thermoplastic polyurethane polymer being made by reacting a polyisocyanate with a chain extender, without any polyol being present, and wherein said first rigid thermoplastic polyurethane polymer has a hardness of greater than 60 Shore D;
   (b) providing a second thermoplastic polyurethane polymer;
   (c) absorbing at least one hydrolytically and thermally stable catalyst into said second thermoplastic polyurethane polymer after polymerization of said second thermoplastic polyurethane polymer, said catalyst being capable of depolymerizing said first rigid thermoplastic polyurethane at melt processing temperatures and repolymerizing said first rigid thermoplastic polyurethane as said first rigid thermoplastic polyurethane is cooled below melt processing temperatures, wherein said catalyst comprises dimethyl tin dilauryl mercaptide, dibutyl tin dilauryl mercaptide, or dioctyl tin dilauryl mercaptide;
   (d) blending said first rigid thermoplastic polyurethane polymer and said second thermoplastic polyurethane polymer to form a thermoplastic polyurethane polymer blend;
   (e) heating said thermoplastic polyurethane polymer blend to a temperature sufficient to melt said thermoplastic polyurethane polymer blend and depolymerize said first rigid thermoplastic polyurethane polymer;

(f) drawing a fiber bundle continuously through the melted thermoplastic polyurethane polymer blend;

(g) impregnating the drawn fiber bundle with the thermoplastic polyurethane polymer blend to form a composite melt;

(h) cooling said composite melt to repolymerize said first rigid thermoplastic polyurethane polymer.

16. The process of claim 15, wherein said composite has from about 10 to about 80 weight percent fiber.

17. The process of claim 16, wherein said composite has from about 25 to about 55 weight percent fiber.

18. The process of claim 15, wherein said fiber is selected from the group consisting of glass fiber and carbon fiber.

19. The process of claim 15, wherein said cooled composite is cut into lengths of from about 0.12 inch to about 1.0 inch.

20. The process of claim 19, wherein said cooled composite is cut into lengths of from about 0.25 inch to about 0.75 inch.

\* \* \* \* \*